Sept. 9, 1924.
J. McDONOUGH
1,507,930
GAUGING DEVICE
Filed April 10, 1922      2 Sheets-Sheet 1
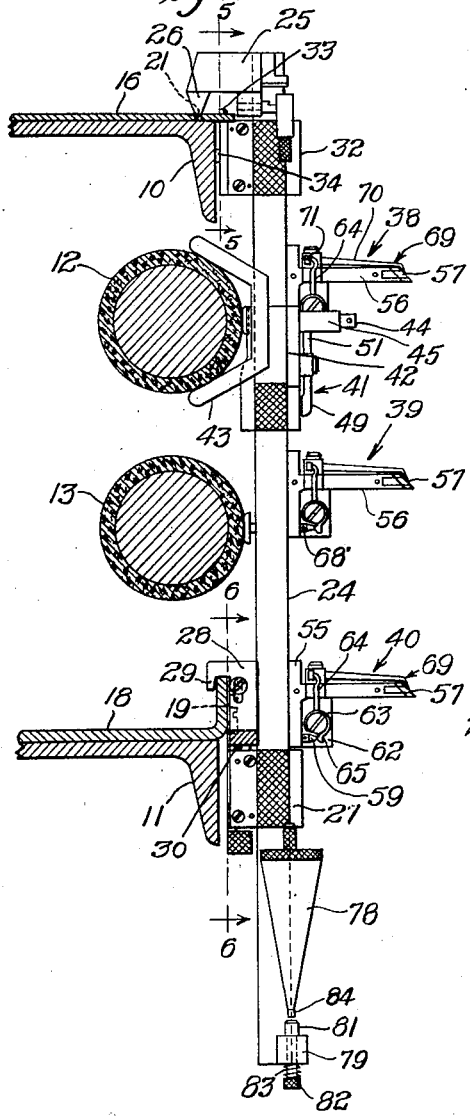
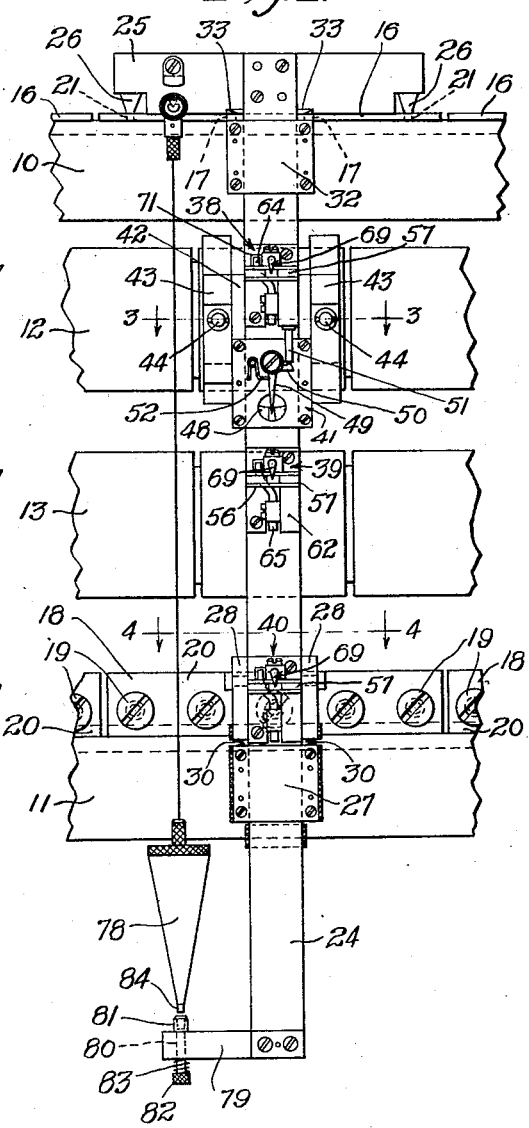
Inventor
John McDonough
by G. M. Campbell
Atty.

Sept. 9, 1924.

J. McDONOUGH

GAUGING DEVICE

Filed April 10, 1922    2 Sheets-Sheet 2

1,507,930

Inventor
John McDonough
by *A.M. Campbell*
Atty.

Patented Sept. 9, 1924.

1,507,930

UNITED STATES PATENT OFFICE.

JOHN McDONOUGH, OF CHICAGO, ILLINOIS, ASSIGNOR TO WESTERN ELECTRIC COMPANY, INCORPORATED, OF NEW YORK, N. Y., A CORPORATION OF NEW YORK.

GAUGING DEVICE.

Application filed April 10, 1922. Serial No. 551,291.

*To all whom it may concern:*

Be it known that I, JOHN McDONOUGH, a citizen of the United States, residing at Chicago, in the county of Cook and State of Illinois, have invented certain new and useful Improvements in Gauging Devices, of which the following is a full, clear, concise, and exact description.

This invention relates to gauging devices, and more particularly to a gauging device for alining and positioning friction rolls and clutch supporting members used in driving the brush carriages in mechanical telephone switching systems.

The object of the invention is to provide a gauging device which combines means by which friction rolls may be expeditiously and accurately checked for alinement upon a secondary support, the perpendicular plumbing of a secondary support upon a primary support forming the main frame of the machine and the alinement of clutch supporting members with respect to each other upon the secondary support.

The gauging device in the preferred embodiment of the invention comprises a supporting member adapted to be carried by top and bottom clutch plates required to be accurately spaced with respect to each other and equipped with members, one at each end, adapted to be moved into engagement with the plates to check their position with respect to each other. Carried upon the support are a plurality of indicator gauges, associated parts of which are adapted to be displaced by their engagement with the periphery of the friction rolls when the gauge is mounted on the clutch plates. In this position of the apparatus the indicator gauges indicate the amount of displacement of the friction rolls and also whether the distance from the periphery of the rolls to the outside vertical face of the bottom clutch plate is within certain limits. One of the indicator gauges and its associated parts is adapted to indicate whether the distance from the horizontal center line of the top roll to the top face of the upper clutch plate is within certain limits.

Also carried by the gauge supporting member at its upper end is a plumbing means which is adapted to enter a cup-shaped member movably supported upon the lower end of the supporting member when the cup shaped member is moved upward. If the lower end of the plumbing means does not touch the inside of the cup shaped member when it is raised, the friction rolls and their support are perpendicular upon the main frame of the machine within certain limits.

In the drawings:

Figure 1 is a front view of the gauging device embodying the features of the invention mounted in position for gauging upon a friction roll drive;

Fig. 2 is an end view thereof;

Figure 3:
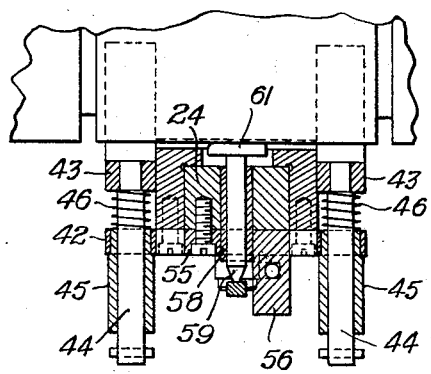
Fig. 3 is an enlarged fragmentary plan section taken upon the line 3—3 of Fig. 1.

As shown in the drawings, only such parts or portions of the friction roll drive and its primary support or frame have been indicated which are necessary to a description of the gauging device and the method of using it.

The friction roll drive frame includes top and bottom channel members 10 and 11. Mounted horizontally between the channels 10 and 11 and adapted to be raised or lowered as a unit and to be moved laterally therebetween by suitable adjusting means (not shown) are friction rolls 12 and 13 which are used to drive the brush carriages in mechanical telephone switching machines.

The means for adjusting the rollers 12 and 13 up or down consist of means adapted to raise or lower either end of the rolls, and the means for moving the rolls laterally on the frame provide for moving the top or lower roll laterally in either direction, thereby providing for correct alinement of the rolls in all directions.

Figure 5:
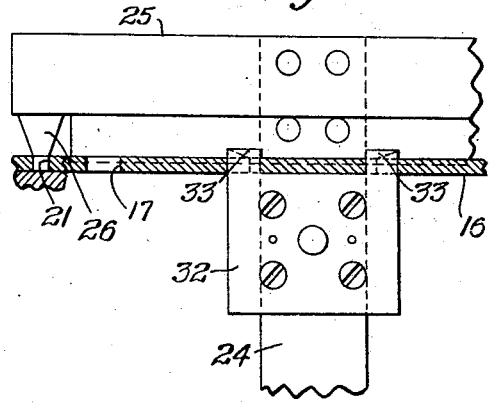
Fig. 5 is an enlarged fragmentary vertical section taken upon the line 5—5 of Fig. 2.

Mounted upon and suitably secured to the top channel 10 are a plurality of top clutch locating plates 16—16 each provided with a plurality of rectangular shaped slots indicated at 17—17 in its top face and along its front edge. (See Figs. 1 and 5). A plurality of bottom clutch locating plates 18—18 are suitably secured upon the top of the bottom channel 11, each equipped with a plurality of shouldered screws 19—19 along a vertical face 20 thereof. The plates 16 and 18 support a plurality of clutch members (not shown) which upon actuation cause the friction rolls to transmit motion to the brush carriages. At the lower end of its rear vertical face the clutch member is slotted to receive the shoulder on the screw 19 and upon its top and rear face and at points equa-distant from the vertical center line of the slotted lower vertical face is equipped with a pair of upwardly projecting lugs which in assembly are entered in the slots 17—17. The slotted end of the clutch member rests on the shoulder of the screw 19 while the lugs at the top project into the slots 17—17. It is essential, therefore, that the vertical center line of the screw 19 should be equi-distant between two of the slots 17 before the clutch members are mounted on the clutch plates. The plates are firmly secured to the channels only after the gauge has correctly positioned them thereon with respect to the rolls. Up to the above time the plates may be loosely secured to the channels with a free movement between the securing means.

The plates 16—16 are also provided with a plurality of circular openings 21—21 at the rear of the slots 17—17 and spaced on lines drawn midway between the slots 17—17 for the purpose of locating the gauge upon the friction roll drive frame. The frame of the gauging device is T-shaped and comprises a main supporting bar 24 and a top cross bar 25 suitably secured thereto and equipped with pins 26 at each end which project downward from a rearwardly projecting part thereof and positioned thereon so as to engage two of the openings 21—21 when the gauge is positioned upon the friction roll drive frame with the pins 26 resting on the top face of the channel 10. Suitably carried at the rear face of the bar 24 upon a slide member 27 and near its lower end at each side thereof and adapted to be moved vertically upon the slide 27 is a pair of plates 28 formed with hooked upper ends 29. The plates 28 are each adapted to be moved down against the action of a spring 30 bearing upward into a pocket formed in the lower end thereof. The gauge is positioned upon the friction roll drive frame by entering the pins 26 at the top thereof in the openings 21 of the plate 16 and then moving the plates 28 with the hooked ends 29 into engagement with the vertical face of the plate 18. The hooked ends 29 are formed so that there is a certain binding or wedging action between them and the vertical face of the channel 11 which acts to hold the plate 28 down against the action of the springs 30.

Mounted to slide upon the upper end of the bar 24 is a slide member 32 with two lugs 33 formed on its upper surface and at the rear thereof which are adapted to fit snugly within the slots 17—17 when the slide 32 is moved upward. A spring pressed button 34 is mounted in the rear face of the slide 32 and acts against the vertical face of the channel 10 to hold the slide 32 in position when moved upward. When the gauge is removed from the friction roll frame the slide moves down freely.

The gauge illustrated is adapted to gauge a friction roll drive equipped with three friction rolls instead of two, as illustrated, and consequently the bar 24 is long enough for the slide 27 to be moved down to take care of a three roll friction drive. Slidably mounted upon the slide 27 and at its rear is a feeler gauge 35, the rear face of which is in line with the vertical face of the plate 18 and is forked shaped at its upper end to straddle the shoulder on the screw 19 between the back of the screw head and the vertical face of the plate 18.

When the feeler gauge 35 has straddled the shoulder on the screw 19 and the lugs 33 have been entered correctly in the slots 17, the plates 16 and 18 are correctly positioned with respect to each other and are then ready to be firmly secured to the channels 10 and 11 respectively.

Positioned upon the bar 24 intermediate the slides 27 and 32 are three indicator gauges 38, 39 and 40 for indicating whether the distance from the periphery of the rolls to the outside vertical face of the bottom clutch plate 18 is within certain limits. In the drawing the gauge 40 is not being used since a two roll drive is illustrated, but in a three roll drive all three gauges will be used. Associated with indicator gauge 38 is a gauge 41 which indicates whether the distance from the horizontal center line of the top roll to the top face of the upper channel is within certain limits. Yieldably mounted upon a plate 42 which is slidably carried upon the bar 24 is a pair of U-shaped members 43 one at each side thereof. The U-shaped members 43 are secured to studs 44 which slide freely in sleeves 45 secured to the plate 42. Suitable springs 46 are mounted on the studs 44 and between the U-shaped members 43 and the plate 42 to hold the U-shaped members in contact with the periphery of the friction roll.

The plate 42 is provided with a scale 48 which is graduated to show a maximum and minimum of one-sixty-fourth inch to left and right respectively of a central portion. A pointer 49 is pivoted upon the plate 42 and equipped with an arm 50 which is held in a neutral position on the scale 48 and always in engagement with a stationary pin 51 which is carried upon the normally stationary bar 24, by a spring 52 suitably mounted upon the plate 42.

Figure 4:
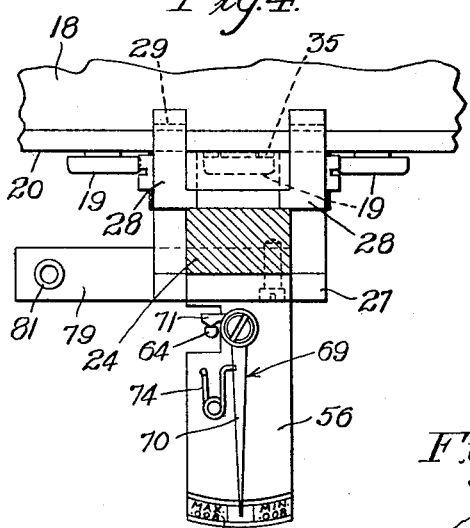
Fig. 4 is a similar view taken upon the line 4—4 of Fig. 1.
Figure 6:
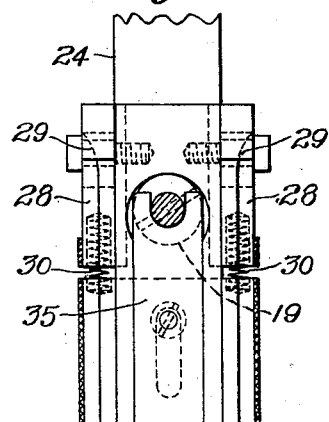
Fig. 6 is a similar view taken upon the line 6—6 of Fig. 2, and Figs. 7 and 8 are enlarged fragmentary views of portions of Fig. 1 illustrating the scales associated with the gauging device.
Figure 7:
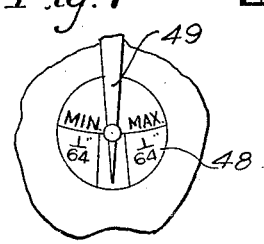
Figure 8:
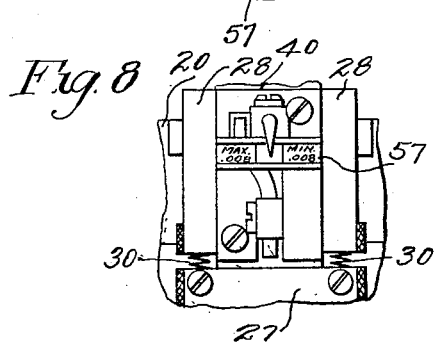

In mounting the gauge upon the friction roll frame the U-shaped members 43 will contact with the periphery of the upper roll and be held in firm contact therewith by the springs 46. Since the members 43 are carried upon the plate 42 which is slidably carried upon the bar 24, they will be moved either up or down, depending upon the position of the friction roll and will consequently cause the pointer 49 to be moved about its pivot due to the arm 50 thereof bearing against the stationary pin 51 and to the action of the spring 52, which causes the arm 50 to keep in contact with the pin 51 to indicate upon the scale 48 whether the longitudinal center line of the roll is within plus or minus one-sixty-fourth of an inch of the required dimension. If the roll is not positioned within the maximum or minimum limits with respect to the top face of the upper channel, it is raised or lowered by means of the adjustable supporting means provided therefor (not shown) until the pointer 49 indicates by its position on the scale 48 that the distance is within the specified limits. The gauges 38, 39 and 40 for indicating whether the distance from the periphery of the rolls to the outside vertical face of the bottom clutch plate 18 is within certain limits, are all identical in operation and construction, and as shown in Figs. 3 and 4, consist of a plate 55 which is secured to the bar 24 and formed with a horizontally disposed arm 56. The arm 56 is cut back at its end at an angle of approximately 45° from the vertical and is curved in a horizontal direction. The angular face of the arm 56 is equipped with a scale 57 which is graduated to show a maximum and minimum of .008 inch to the left and right respectively of a central portion. Slidably carried within a bearing sleeve 58 secured in the bar 24 and passing through a suitable opening formed in the plate 55 is a pin 59.

The pin 59 is mounted on the bar 24 in alinement with the horizontal center line of the friction roll and is equipped with a head 61 which is adapted to be held in contact with the periphery of the roll when the gauge is mounted upon the friction roll frame. Suitably pivoted to a vertically disposed wall 62 formed on the plate 55 and below the arm 56 thereof is a lever 63 equipped with a long arm 64 and a short arm 65. The short arm 65 is adapted to engage the tapered end of the pin 59 which projects through the plate 55 a suitable distance and is equipped with a pin 68 which limits its movement.

Pivotally and centrally disposed upon the upper face of the arm 56 is a pointer 69 equipped with a long arm 70 and a short arm 71 at right angles thereto. The pointer 69 is turned down at its end over the angular face of the arm 56 and is held in a central position on the scale 57 by a spring 74 suitably mounted on the upper face of the arm 56. One end of the spring 74 engages the long arm 70 of the pointer 69. The spring 74 is adapted to keep the short arm 71 always in engagement with the long arm 64 of the lever 63 when the gauge is in position. When the gauge is mounted upon the frame the displacement of the pin 59, caused by the distance from the periphery of the rolls to the outside vertical face of the bottom clutch plate 18 not being within certain limits, is indicated by the movement of the pointer 69 either to the left or right of the central portion on the scale 57.

The roll or rolls are then adjusted laterally upon the frame until the pointer 69 indicates upon the scale 57 that the periphery of the rolls is within plus or minus .008 inch of the required distance from the vertical face of the bottom clutch plate.

The means for checking the perpendicular position of the friction roll frame upon the main frame is used only after the rolls and clutch plates have been properly positioned upon the friction roll frame and consists of a plumb line and bob 78 which is suitably suspended from the cross bar 25 of the gauge. Mounted at the lower end of the bar 24 is an arm 79 and mounted loosely thereon in a vertical direction is a pin 80. Secured to the upper end of the pin 80 is a cup shaped member 81 and at its lower end is a knurled head 82. The member 81 is normally held down against the top of the arm 79 by a spring 83 mounted on the pin 80 between the bottom of the arm 79 and the head 82. The plumb line and bob are in vertical alinement with the cup shaped member 81 and the lower end of the bob is formed with a projection 84 which is circular in cross section. To check the perpendicular position of the friction roll frame upon the main frame the cup shaped member is raised by pressing upward on the head 82 and if the wall of the opening in the member 81 does not contact with the projection 84 on the bob the friction roll drive frame is perpendicular upon the main frame of the machine within certain required limits.

What is claimed is:

1. A device for checking the position of one member with relation to another member, comprising a supporting element adapted to be removably secured to one of the members, elements movably carried by said supporting element and adapted to engage the other member, and means actuated by the engagement of said movable elements with said member to be checked for indicating the position thereof with relation to the other member.

2. A device for checking the position of one member with relation to another member, comprising a supporting element adapted to be removably secured to one of the members, elements movably carried by said supporting element and adapted to engage the other member, and means on said support actuated by the engagement of said movable elements with said member to be checked for indicating the position thereof with relation to the other member.

3. A device for checking the position of one member with relation to another member, comprising a supporting element adapted to be removably secured to one of the members, elements movably carried by said supporting element and adapted to engage the other member, one of said movable elements movable in a direction at an angle to the other element, and means actuated by the engagement of said movable elements with said member to be checked for indicating the position thereof with relation to the other member.

4. A device for checking the vertical position of one member with relation to another member, comprising a supporting element adapted to be removably secured to one of the members, an element movable in different planes carried by said supporting element and adapted to engage the other member, said movable element having contacting surfaces for engaging at different points the member to be checked, and means actuated by the engagement of said movable element with said member to be checked at the instant of securing said supporting element in position for indicating the vertical position thereof with relation to the other member.

5. A device for checking the vertical position of one member with relation to another member, comprising a supporting element adapted to be removably secured to one of the members, an element movable in a vertical and horizontal direction carried by said supporting element and adapted to be brought into engagement with the member to be checked at the instant of securing said supporting element in position, and means actuated by the engagement of said movable element with said member to be checked for indicating the vertical position thereof with relation to the other member.

6. A device for checking the vertical position of a member upon its support comprising, a supporting bar adapted to be removably secured to the support, a member yieldable in a vertical and horizontal direction carried upon said supporting bar and adapted to be brought into engagement with the member to be checked at the instance of securing the supporting bar in position, and means associated with said yieldable member for indicating whether the member engaged by said yieldable member is positioned vertically upon its support within certain limits.

In witness whereof, I hereunto subscribe my name this 7th day of April A. D., 1922.

JOHN McDONOUGH.